United States Patent
Mo et al.

(10) Patent No.: US 9,059,846 B2
(45) Date of Patent: Jun. 16, 2015

(54) RETRANSMISSION CONTROL TECHNIQUE

(75) Inventors: Ronghong Mo, Singapore (SG); Ping Luo, Singapore (SG)

(73) Assignee: PANASONIC CORPORATION, Osaka (JP)

(*) Notice: Subject to any disclaimer, the term of this patent is extended or adjusted under 35 U.S.C. 154(b) by 1025 days.

(21) Appl. No.: 12/522,869

(22) PCT Filed: Jan. 25, 2007

(86) PCT No.: PCT/SG2007/000023
§ 371 (c)(1),
(2), (4) Date: Jul. 10, 2009

(87) PCT Pub. No.: WO2008/091223
PCT Pub. Date: Jul. 31, 2008

(65) Prior Publication Data
US 2010/0017674 A1 Jan. 21, 2010

(51) Int. Cl.
G08C 25/02 (2006.01)
H04L 1/18 (2006.01)
H04L 1/14 (2006.01)
H03M 13/00 (2006.01)

(52) U.S. Cl.
CPC ............. *H04L 1/1816* (2013.01); *H04L 1/1819* (2013.01); *H04L 1/1825* (2013.01)

(58) Field of Classification Search
USPC .......................................... 714/748, 751, 750
See application file for complete search history.

(56) References Cited

U.S. PATENT DOCUMENTS

| | | | |
|---|---|---|---|
| 6,631,127 B1 * | 10/2003 | Ahmed et al. | 370/349 |
| 6,700,867 B2 * | 3/2004 | Classon et al. | 370/216 |
| 7,155,655 B2 * | 12/2006 | Cheng | 714/748 |
| 7,409,001 B2 * | 8/2008 | Ionescu et al. | 375/267 |
| 7,440,399 B2 * | 10/2008 | Julian et al. | 370/230 |
| 7,447,967 B2 * | 11/2008 | Onggosanusi et al. | 714/748 |
| 7,447,968 B2 * | 11/2008 | Ha et al. | 714/748 |
| 7,536,628 B2 * | 5/2009 | Kan et al. | 714/780 |
| 7,554,985 B2 * | 6/2009 | Ihm et al. | 370/394 |
| 7,620,872 B2 * | 11/2009 | Kwon et al. | 714/751 |
| 7,630,355 B2 * | 12/2009 | Tao et al. | 370/343 |
| 7,668,188 B2 * | 2/2010 | Chang et al. | 370/415 |
| 7,751,364 B2 * | 7/2010 | Won et al. | 370/329 |
| 7,823,040 B2 * | 10/2010 | Cheng | 714/751 |
| 2006/0200722 A1 * | 9/2006 | Braun | 714/748 |
| 2007/0060146 A1 * | 3/2007 | Won et al. | 455/445 |
| 2009/0028263 A1 | 1/2009 | Yu et al. | |

FOREIGN PATENT DOCUMENTS

| WO | WO 2004/075023 | 9/2004 |
|---|---|---|
| WO | WO 2006/070836 | 7/2006 |
| WO | WO 2006/101213 | 9/2006 |

OTHER PUBLICATIONS

International Search Report mailed Mar. 30, 2007 in PCT/SG2007/000023, 2 pages.

* cited by examiner

*Primary Examiner* — Joseph D Torres
(74) *Attorney, Agent, or Firm* — Brinks Gilson & Lione

(57) ABSTRACT

A retransmission control method, a transmitter and a receiver. The method comprises the steps of receiving, at a MIMO transmitter, a NACK signal indicating an unsuccessful decoding of a coded data packet at a MIMO receiver; receiving a reliability measure associated with one or more transmitted spatial data streams for the unsuccessfully decoded data packet; comparing the reliability measure with at least one predetermined threshold; and selecting a retransmission protocol based on the comparison of the reliability measure with the at least one predetermined threshold.

9 Claims, 8 Drawing Sheets

RETRANSMISSION CONTROL TECHNIQUE

FIELD OF INVENTION

The present invention broadly relates to a retransmission control method for transmitting data packets in Multiple-Input Multiple-Output (MIMO) wireless communication systems. The present invention also relates to a transmitter for a MIMO wireless communication system, and to a receiver for a MIMO wireless communication system.

BACKGROUND

In MIMO wireless communication systems, a Hybrid Automatic Repeat request (HARQ) technique is widely adopted to improve transmission reliability. In a typical implementation that adopts the HARQ technique, a transmitter transmits each data packet with Cyclic Redundancy Check (CRC) bits for error detection. At a receiver, the content of each of transmitted data packet is validated through CRC. If a received data packet fails to pass the CRC validation, the receiver feeds back a negative acknowledgment (NACK) signal to the transmitter to request retransmission. On receiving the request, the transmitter retransmits the precedingly received but unsuccessfully decoded data packet. Subsequently, the receiver combines the retransmitted data packet with the precedingly received data packet to improve decoding performance. On the other hand, if a received data packet passes the CRC validation, the receiver transmits an acknowledgement (ACK) signal back to the transmitter to acknowledge the successful reception and decoding of the data packet.

There are two typical HARQ techniques or data packet retransmission protocols, namely Chase combining protocol and Incremental Redundancy (IR) protocol. According to the Chase combining protocol, a preceding unsuccessfully decoded data packet is simply retransmitted after a transmitter receives a NACK signal. Following the IR protocol, only parity information that differs from what is contained in the preceding transmitted data packet is retransmitted progressively to provide more redundancy for assisting decoding the system information in subsequent retransmissions.

In each IR protocol based retransmission, a transmitter transmits data packets that are not self-decodable. At a receiver, according to the IR protocol, all the data packets (originally transmitted data packets and retransmitted data packets) are combined and decoded at a lower rate. As a result, the IR protocol achieves coding gain for decoding system information by providing more redundancy. In contrast, Chase combining protocol provides energy gain to improve decoding performance by combining the multiple copies of the original data packets.

In practice, the received coded data packets which are not decoded correctly are often stored at the receiver rather than being discarded, and when a retransmitted coded data packet is received, the information from preceding coded data packets and the retransmitted data packet are combined before being fed into a decoder, which increases the possibility of successful decoding.

Transmission capacities of wireless communication systems can be enhanced by the simultaneous transmission of multiple spatial data streams over MIMO communication channels that employ multiple transmit antennas ($N_T$) and multiple receive antennas ($N_R$). The simultaneously transmitted data streams may belong to the one coded data packet (Single Code Word, SCW MIMO) or different coded data packets (Multiple Code Words, MCW MIMO). Here a codeword is equivalent to a coded data packet. In a SCW MIMO system, at a transmitter, a coded data packet is segmented into multiple (spatial) data streams and transmitted via multiple transmission antennas respectively. At a receiver of the SCW MIMO system, all detected data streams are multiplexed into a single data packet that will be passed through a channel decoder and a CRC check module for decoding and CRC validation respectively. Subsequently, an ACK/NACK signal is transmitted to the transmitter of the SCW MIMO system to acknowledge the reception quality of the transmitted data packet. On the other hand, in a MCW MIMO system, each (spatial) data stream belongs to an independently coded data packet. Multiple data streams from multiple coded data packets are transmitted independently from multiple transmitting antennas ($N_T$). At a receiver of the MCW MIMO system, each detected data stream undergoes an independent channel decoding and CRC validation process. A plurality of ACK/NACK signals are fed back to the transmitter to acknowledge the reception quality of multiple coded data packets. In both SCW MIMO and MCW MIMO systems, since the data streams are transmitted by different antennas and travel through different communication linkages (i.e., antennas), the spatial data streams have different degrees of link conditions. As a result, the demodulation quality varies with spatial data streams. The control method of a HARQ process (retransmission protocol, coding rate and spatial processing method, etc) in MIMO systems for retransmissions needs to address possible problems caused by antenna diversity in MIMO systems.

A need therefore exists to provide a retransmission control technique that seeks to address at least one of the problems indicated above.

SUMMARY

In accordance with a first aspect of the present invention there is provided a retransmission control method comprising the steps of receiving, at a MIMO transmitter, a NACK signal indicating an unsuccessful decoding of a coded data packet at a MIMO receiver; receiving a reliability measure associated with one or more transmitted spatial data streams for the unsuccessfully decoded data packet; comparing the reliability measure with at least one predetermined threshold; and selecting a retransmission protocol based on the comparison of the reliability measure with the at least one predetermined threshold.

The retransmission control method may further comprise the step of retransmitting the data packet according to the selected retransmission protocol.

The retransmission protocol may comprise a Chase combining protocol or an Incremental Redundancy protocol.

The reliability measure may comprise a system bits component and a parity bits component.

The system bits component may comprise system bits reliability data associated with each data stream for the unsuccessfully decoded data packet in the SCW MIMO transmission, and the parity bits component comprises parity bits reliability data of the unsuccessfully decoded data packet.

The selecting of the retransmission protocol may comprise selecting the Incremental Redundancy protocol for a retransmission data packet if the system bits reliability data is higher than a system bits threshold; or selecting the Chase combining protocol for the retransmission packet if the system bits reliability data is lower than or equal to the system bits threshold.

The method may further comprise selecting a lower coding rate, as compared to an original transmission, for the retransmission data packet using the Chase combining protocol if the parity bits reliability data is lower than or equal to a parity bits threshold; or selecting a same coding rate, as compared to the original transmission, for the retransmission data packet using the Chase combining protocol if the parity bits reliability data is higher than the parity bits threshold.

The method may further comprise segmenting the retransmission data packet onto a plurality of spatial data streams over the same antennas as compared to the original transmission using the Chase combining protocol if the system bits reliability measure data is higher than the system bits threshold; or segmenting the data packet onto a plurality of data streams over different antennas as compared to the original transmission using the Chase combining protocol if the system bits reliability data is higher than the system bits threshold.

The segmenting of the retransmission data packet may be performed after the selecting of the lower or same coding rate.

The system bits component may comprise system bits reliability data associated with all data streams in the MCW MIMO transmission of respective unsuccessfully decoded data packets, and the parity bits component comprises parity bits reliability data associated with said all data streams in the MCW MIMO system.

The selecting of the retransmission protocol may comprise selecting the Incremental Redundancy protocol for a retransmission data packet if the system bits reliability data is higher than a system bit threshold; or selecting the Chase combining protocol for the retransmission packet if the system bits reliability data is lower than or equal to the system bits threshold.

The method may further comprise selecting a lower coding rate, as compared to an original transmission, for the retransmission data packet using the Chase combining protocol if the parity bits reliability data is lower than or equal to a parity bits threshold; or selecting a same coding rate, as compared to the original transmission, for the retransmission data packet using the Chase combining protocol if the parity bits reliability data is higher than the parity bits threshold.

The reliability measure may be based on magnitudes of logarithmic likelihood ratios (LLRs) of respective demodulated system bits and parity bits of the initial unsuccessfully decoded data packet or the combination of the initial unsuccessfully decoded data packet and one or more retransmitted coded data packets.

The reliability measure may be based on the average magnitude of LLRs.

The reliability measure may be based on a least reliable system bit and a least reliably parity bit having lowest respective magnitudes of LLR.

In accordance with a second aspect of the present invention there is provided a transmitter for a MIMO communication system, the transmitter comprising means for receiving a NACK signal indicating an unsuccessful decoding of a coded data packet; means for receiving a reliability measure associated with one or more transmitted spatial data streams for the unsuccessfully decoded data packet; means for comparing the reliability measure with at least one predetermined threshold; and means for selecting a retransmission protocol based on the comparison of the reliability measure with the at least one predetermined threshold.

In accordance with a third aspect of the present invention there is provided a receiver for a MIMO communication system, the receiver comprising means for receiving coded data packets; means for creating a reliability measure associated with one or more spatial data streams for an unsuccessfully decoded data packet; and means for sending a NACK signal indicating an unsuccessful decoding of said unsuccessfully decoded data packet and the reliability measure to a transmitter associated with the sending of the coded data packets.

BRIEF DESCRIPTION OF THE DRAWINGS

The invention will now be described with reference to the enclosed drawings, in which.

DETAILED DESCRIPTION

In the following description, an example implementation for retransmission of data in a MIMO system is described. The example implementation utilises a combination of a Chase combining protocol and an incremental redundancy (IR) protocol in retransmitting the data. A transmitter and a receiver of the MIMO system are broadly described respectively below followed by a detailed description of the example implementation.

It would be appreciated by a person skilled in the art that although the transmitter and the receiver are described to each comprise two transmit and receive antennas respectively in the following, the example implementation may be applied to a transmitter and receiver comprising more than two transmit and receive antennas. Also, although the communications described below use OFDM, it would be appreciated by a person skilled in the art that other single carrier and multicarrier transmission techniques may be used. In the description below, a new data stream refers to a data stream which has not been previously transmitted while a retransmission data stream refers to a data stream which is being retransmitted based on a previously transmitted data stream.

Figure 1:
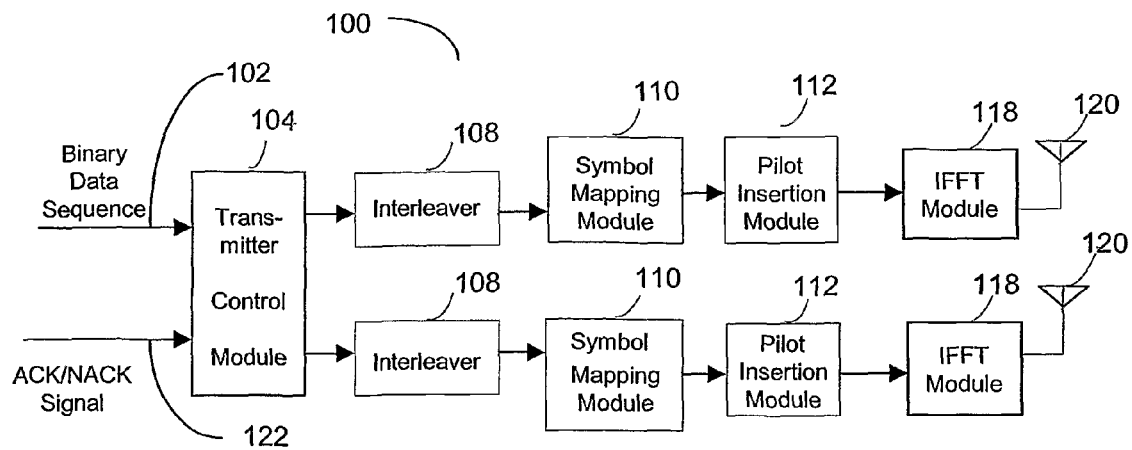
FIG. 1 presents functional modules of a transmitter for a SCW MIMO system or a MCW MIMO system.

FIG. 1 presents functional modules of a transmitter (100) that utilises Orthogonal Frequency Division Multiplexing Multiple Input Multiple Output (MIMO-OFDM) technique. The transmitter (100) comprises a transmitter control module (104) for receiving binary data sequence (102) and ACK/NACK feedback signals (122) from a receiver. The transmitter control module outputs data streams for interleaving at interleavers (108). The interleavers (108) permutate the data bits of the data streams in order to transfer burst errors into independent errors. Bit to symbol mapping is then carried out on the interleaved data streams by symbol mapping modules (110) based on various modulation schemes, such as M-ary Phase Shift Keying (MPSK) and M-ary Quadrature Amplitude Modulation (MQAM) schemes. The interleaved and modulated data streams are further processed by pilot insertion modules (112) to add pilot symbols. The pilot symbols are used to perform channel estimation and synchronization for MIMO OFDM at the receiver. After pilot symbol insertion, symbol mapped data streams are then processed by Inverse Fast Fourier Transform (IFFT) operation modules (118) for baseband implementation. Finally, the processed data streams are transmitted independently through respective transmission antennas (120).

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "selecting", "comparing", "determining", "creating", "generating", "calculating", "outputting", or the like, refer to the action and processes of a computerised system, that manipulates and transforms data represented as physical quantities within the computerised system into other data similarly represented as physical quantities within the computerised system or other information storage, transmission or display devices.

Figure 2:
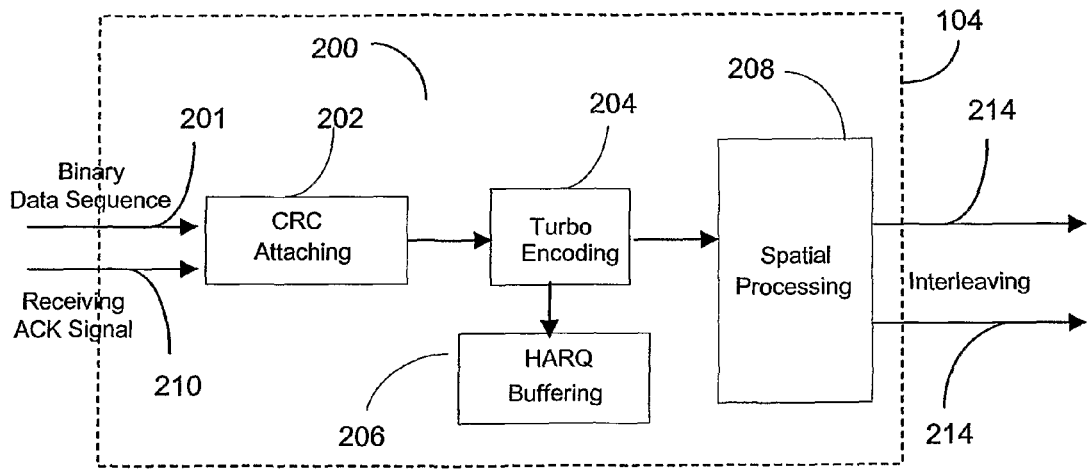
FIG. 2 presents processing steps of a transmitter control module when an ACK signal is received by a SCW MIMO system.

FIG. 2 presents processing steps (200) in the transmitter control module (104) when an ACK signal is received (210) by a SCW MIMO system. The ACK signal is transmitted from a receiver via control channels to the transmitter (100, FIG. 1). The transmitter control module (104) monitors all the control channels and uses the current transmission interval for decoding the ACK signal. Depending on the types of MIMO systems (i.e., SCW MIMO or MCW MIMO), the transmitter control module (104) performs different types of processing. In the SCW MIMO system, newly received binary data sequence (201) is firstly attached with CRC in a CRC attachment module (202). The CRC attached binary data sequence output from module 202 is then channel encoded by turbo encoder (204) as coded data. In the encoder (204), additional redundancy is provided by adding extra data bits to the received binary data sequence (201). It is appreciated that other channel encoders besides Turbo encoder can be used for the channel encoding at this stage. The coded data output from the Turbo encoder (204) contains system information and parity information. The coded data is divided into multiple coded packets and stored in the transmitter buffer (206) in case retransmissions of the binary data sequence (201) are required. One of the multiple coded packets contains system information and some parity information and is transmitted in the original transmission, while the rest of the coded packets, which contain different parity information only, are used for the events when retransmissions are requested.

In the following spatial processing module (208), the coded data packet containing system information and some parity information output from module (204) is spatially processed and segmented into multiple spatial data streams (214) according to the number of transmission antennas ($N_T$) available. Next, the multiple spatial data streams (214) are sent to interleavers (108, FIG. 1) for interleaving.

Figure 3:
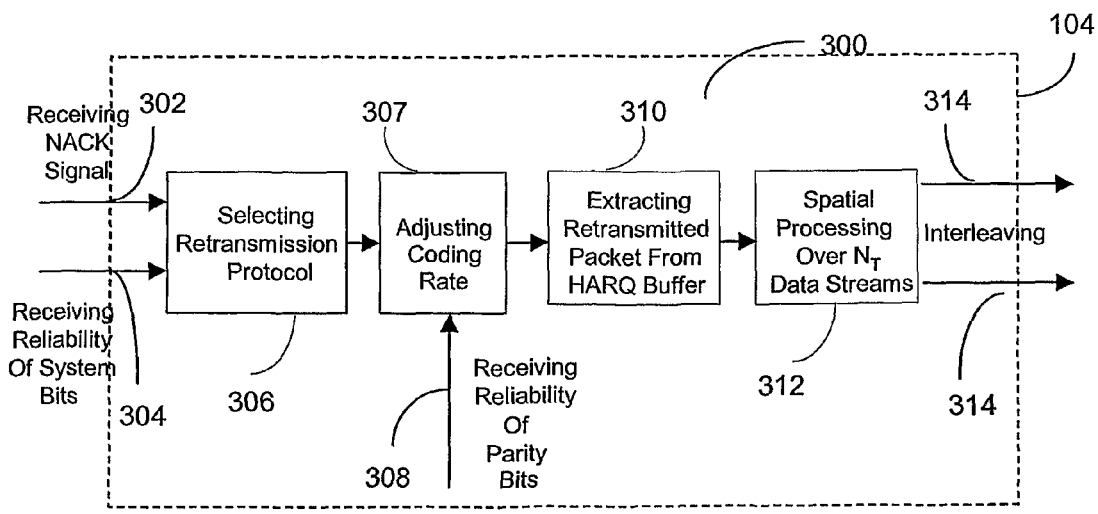
FIG. 3 presents processing steps of the transmitter control module when a NACK signal is received by the SCW MIMO system.

FIG. 3 presents processing steps (300) of the transmitter control module (104) when a NACK signal is received (302) by a SCW MIMO system. Along with the NACK signal, reliability of system bits (304) of all spatial data streams and the reliability of parity bits (308) of previously transmitted data packets are received from the receiver. Based on the reliability of system bits, the transmitter control module (104) firstly decides whether an IR data packet or a Chase data packet is to be retransmitted (306). If the Chase combining protocol is selected (306) for retransmitting the data packet, the transmitter control module (104) adjusts the coding rate of the Chase data packet based on the reliability of parity bits (307). Based on the previous processing steps (306, 307), the transmitter control module (104) further extracts a coded data packet for retransmission (i.e., Chase data packet containing both system bits and parity bits or IR data packet containing parity information only) from the HARQ buffer with a selected coding rate (310). Depending on whether Chase combining protocol or IR protocol is used for retransmissions, a different coded packet is extracted from the transmitter buffer and transmitted. For example, a Chase data packet (a data packet transmitted via Chase combing protocol) contains both system bits and parity bits while an IR data packet (a data packet transmitted via Incremental Redundancy protocol) contains parity bits only. Normally, the Chase packet is simply a repetition of an initial transmission with possible variation in coding rate. However, an IR data packet typically contains different parity bits as compared to the initial transmission. In retransmissions, the choice of retransmission protocols (IR or Chase data packet) and the number of parity bits contained in the Chase data packet can be selected based on channel conditions.

The extracted coded data packet (Chase data packet or IR data packet) is then sent to the spatial processing module (312), which segments the data packet into multiple spatial data streams (314) as spatial processing over $N_T$ antennas (312). These data streams (314) then undergo the interleaving process at the interleavers (108, FIG. 1).

Figure 4:
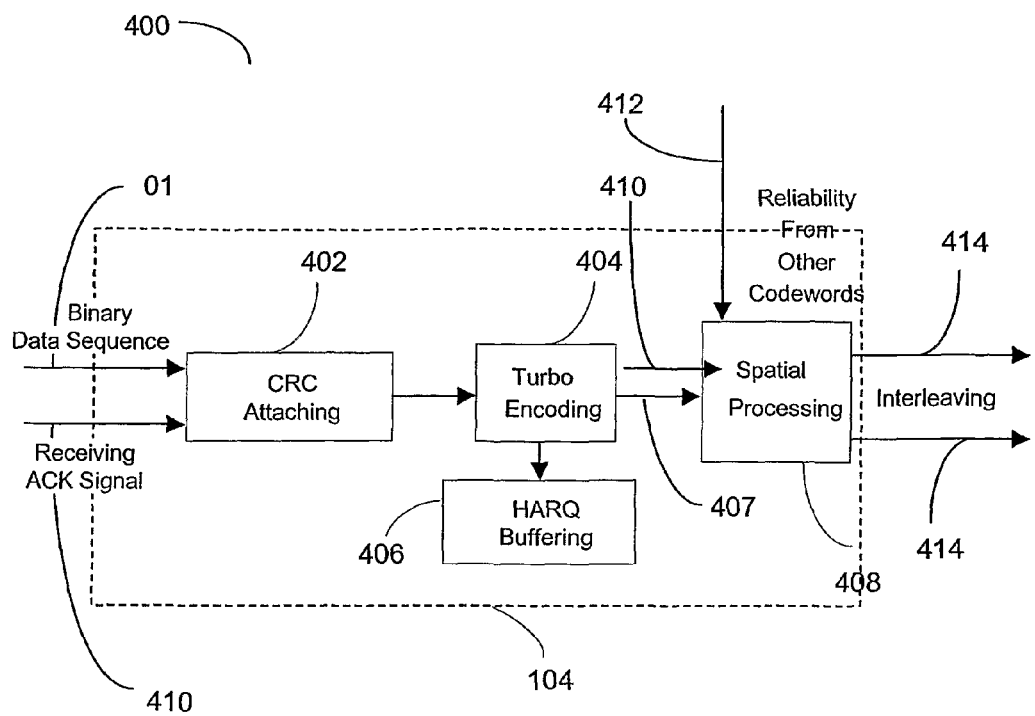
FIG. 4 presents processing steps of the transmitter control module when an ACK signal is received by a MCW MIMO system.

FIG. 4 presents process steps (400) of the transmitter control module (104) when an ACK signal is received (410) for one of the codewords of a binary data sequence precedingly transmitted in a MCW MIMO system. Similar to a SCW MIMO system, when an ACK signal is received (410), the module (104) receives the input binary data sequence (401) at current transmission intervals. The binary data sequence (401) is attached with CRC in a CRC attachment module (402) and further encoded in an encoder (404). The multiple coded data packets output from module 204 are stored in a HARQ buffer (406) in case retransmission of the binary data sequence is requested. A Chase data packet containing both system information and some parity information is typically transmitted in an initial transmission. In contrast to the SCW MIMO system, in the following spatial processing (408), segmentation of the binary data sequence is not performed and the coded data packet output at numeral (407) is used to construct one spatial data stream. This spatial data stream (407), as well as other data streams (410) for the MCW MIMO transmission and, the reliability information of one or more other codewords which receive NACK signals (412), are passed to spatial processing module (408) for spatial processing. The spatially processed coded packets (414) are sent for interleaving. In addition, an antenna switching performed between the antennas used for binary data sequence with an ACK signal and the antennas used for binary data sequence with a NACK signal is carried out.

Figure 5:
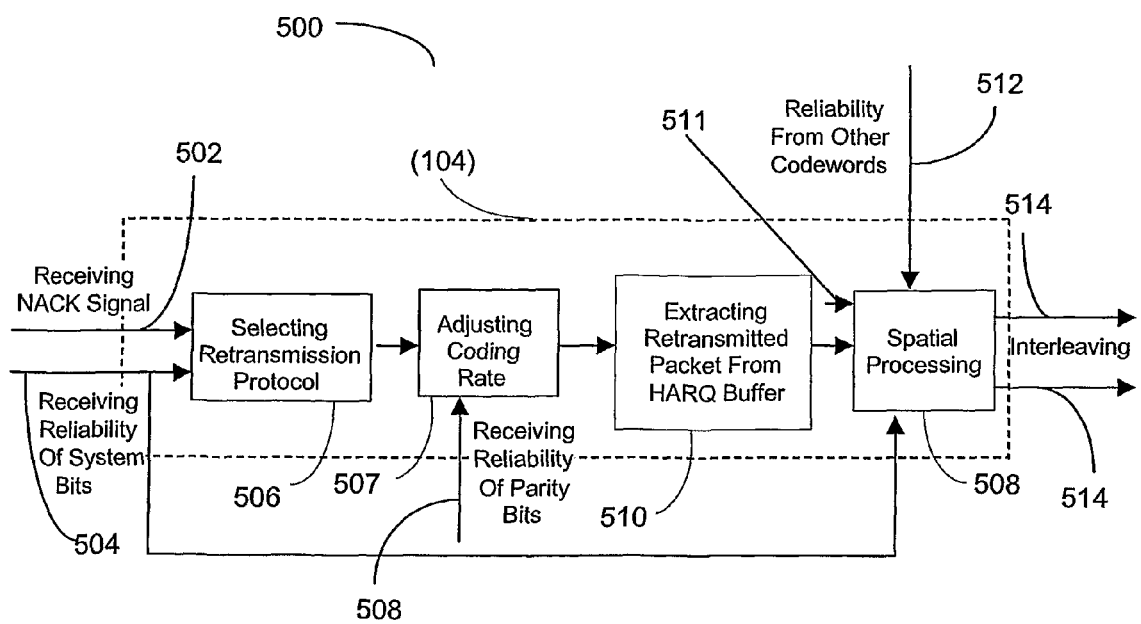
FIG. 5 presents processing steps of the transmitter control module when a NACK signal is received by the MCW MIMO system.

FIG. 5 presents processing steps (500) of the transmitter control module (104) when a NACK signal is received (502) for one of the codewords of a the binary data sequence precedingly transmitted in a MCW MIMO system. Along with the NACK signal, the reliability of system bits (504) and reliability of parity bits (508) of the binary data sequence are both received from the receiver. Based on the reliability of system bits (504), the transmitter control module (104) selects a retransmission protocol (506), i.e. whether an IR data packet or a Chase combining data packet is to be retransmitted. If a Chase data packet is chosen to be retransmitted, the transmitter control module (104) adjusts coding rate (507) of the Chase data packet based on the reliability of parity bits (508) of the binary data sequence. Thereafter, the transmitter control module (104) extracts the corresponding coded data packet (Chase data packet or IR data packet) based on the selection at (506) from the HARQ buffer at (510). In contrast to the SCW MIMO system, in the following spatial processing (508), segmentation of the extracted coded packet is not performed and the coded data packet extracted from HARQ buffer at (510) is used to construct one spatial data stream. The extracted data packet (spatial data stream), is then sent for spatial processing (508) to perform antenna switching if needed. During the spatial processing, other spatial data streams (511) for the MCW MIMO transmission and, when one or more NACK signals were received for other codewords, the respective reliability information (512) are also received for processing at (508). The spatially processed data sequences (514) are then sent for interleaving.

Figure 6:
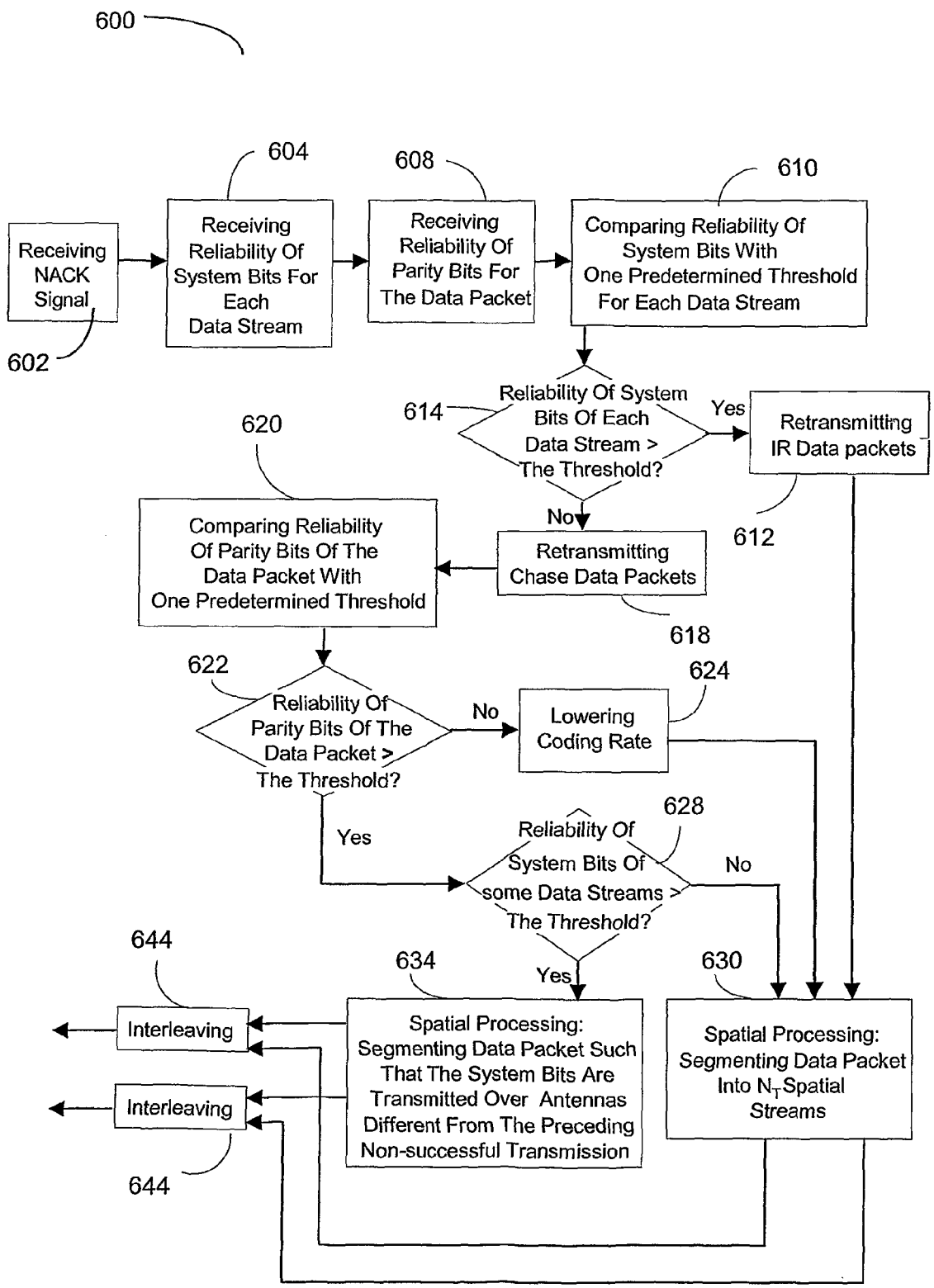
FIG. 6 presents more detailed processing steps of the transmitter control module when a NACK signal is received with reliabilities of system bits of all data streams and reliability of parity bits of a data packet for the SCW MIMO system.

FIG. 6 presents more detailed processing steps (600) of the transmitter control module (104, FIG. 3) when a NACK signal is received (602) with reliabilities of system bits of each spatial data stream (604) and reliability of parity bits of a coded data packet (608) for the SCW MIMO system. When the NACK signal is received (602), the transmitter control module (104, FIG. 3) also receives the reliability information of system bits of the binary data sequence for spatial data streams of each antenna (each spatial data stream) (604) and reliability information of parity bits for the binary data sequence (coded data packet) (608). The reliability of system bits and parity bits are represented by the magnitude of Logarithm Likelihood Ratio (LLR), which will be discussed later in detail. The received reliability of system bits (604) for each antenna is then compared (610) with a predefined threshold of system bits in the module (104, FIG. 3) for each antenna to select a suitable retransmission protocol (IR or Chase combing data packet) (614). The threshold is an empirical positive value.

If the magnitude of LLR of system bits for each spatial data stream is higher than the predefined threshold of system bits, which means that the system bits of each data stream have been demodulated with good quality, it is very likely that the initial unsuccessful decoding is caused by the corruption of the parity bits. As a result, the transmitter control module (104) selects the IR protocol for retransmitting IR data packets (612). The concept of using threshold comparison for retransmission protocol selection is based on the reliability of system bits rather than the reliability of parity bits. This is because the received system bits are the content of that data sequence to be decoded, while the parity bits are used to provide redundancy for assisting the decoding of system bits only. An IR data packet which contains parity bits only is to provide more redundancy to achieve coding gain for retransmitting (612). The IR data packet is further spatially processed (630) by segmenting the data packet into $N_T$ spatial data streams, regardless whether it is segmented over the same or different antennas compared to the preceding unsuccessfully received transmission. The processed IR data packet is sent for interleaving (644) accordingly.

However, if the magnitude of LLR of the system bits for one or more spatial data streams is lower than or equal to the predefined threshold of the system bits, it is highly possible that the system bits of the received binary data sequence are not received reliably thus causing the unsuccessful decoding. Hence, a Chase data packet which contains both the system bits and the parity bits is prepared for retransmitting (618) to improve transmission quality of the system bits by providing energy gain.

When retransmitting the Chase data packet (618), the transmitter control module (104, FIG. 3) compares the reliability of parity bits of the data packet with one predefined reliability threshold (620) of parity bits to determine a proper coding rate used in the subsequent retransmission. The computation of the reliability of parity bits will be discussed later in detail. Similar to the reliability threshold of system bits, the threshold of parity bits is also a positive empirical value. If the reliability of parity bits is lower than or equal to the threshold of parity bits, which means that the parity bits are severely corrupted and therefore cannot provide sufficient redundancy for decoding, a larger number of parity bits are transmitted in the subsequent retransmission to provide more redundancy for ensuring decoding of the system bits. In short, a Chase data packet with lower coding rate is selected (624) for spatial processing. For example, ⅓ of the coding rate can be used for spatial processing instead of ½ of the coding rate used in the preceding unsuccessful transmission. After the lowering of the coding rate for the Chase data packet (624), the transmitter control module (104, FIG. 3) performs spatial processing (630) where the selected Chase data packets are segmented into $N_T$ spatial streams (630), regardless whether segmentation occurs over the same or different antennas compared to the preceding unsuccessfully received transmission. Finally, the segmented data packet leaves the transmitter control module (104, FIG. 3) for interleaving (644).

Further, if the reliability of parity bits of the data packet is larger than the predetermined threshold of parity bits at the comparison (622), the module (104, FIG. 3) also checks if the reliability of system bits of one or more spatial data streams are higher than the predetermined threshold (628) of system bits. If the reliabilities of system bits of one or more spatial data streams are higher than the predetermined threshold of system bits, the data packet will be segmented such that the system bits are transmitted over antennas different from the preceding unsuccessful transmission (634). The purpose of this antenna switching for system bits is to provide antenna diversity for the spatial data streams. If the reliability of system bits of none of the spatial data streams is higher than the predetermined threshold of system bits, the data packet will be segmented into $N_T$ data streams without antenna switching at (630). The segmented spatial data streams, either with antenna switching (634) or without antenna switching (630), will be passed for interleaving (644).

Figure 7:
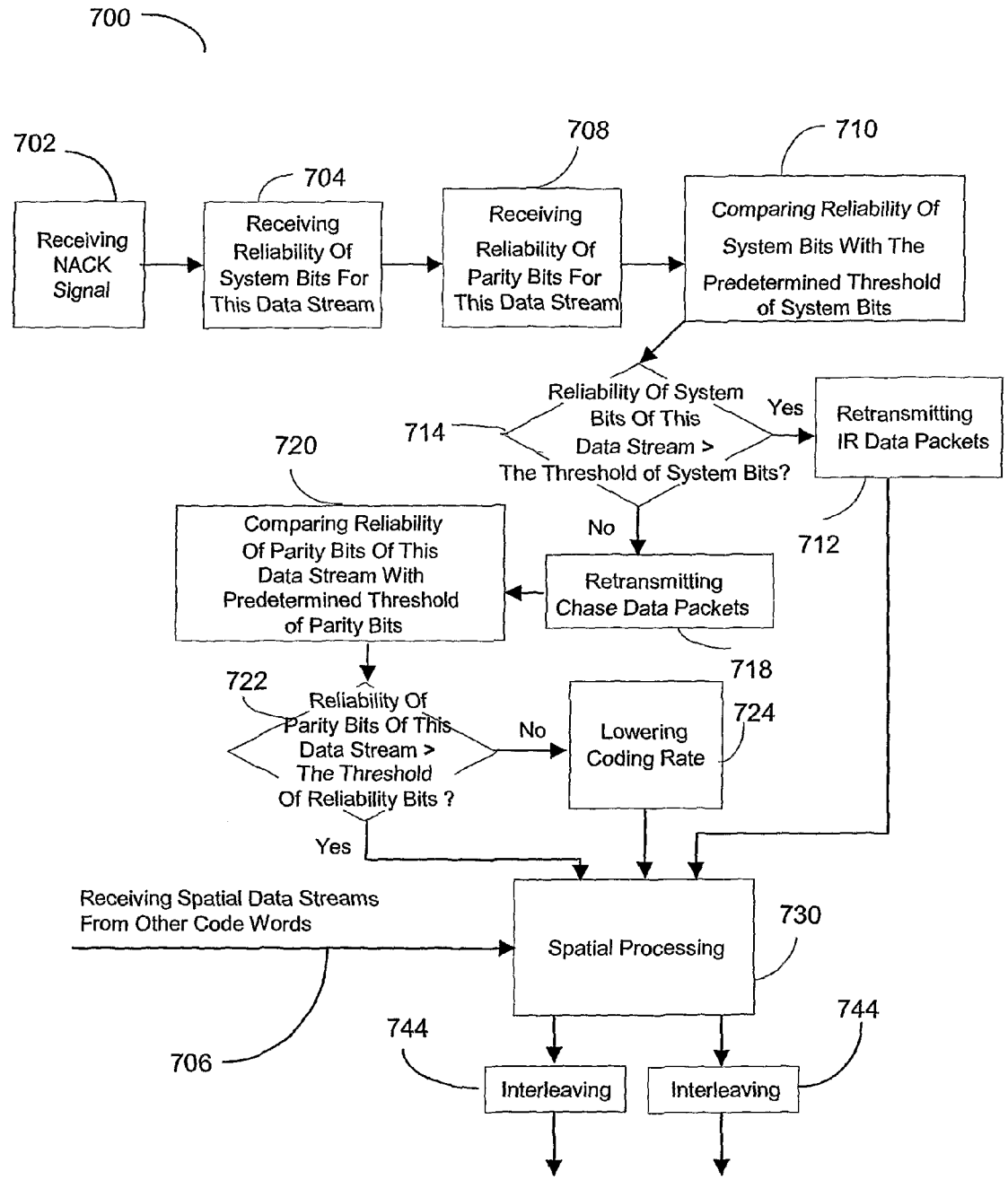
FIG. 7 presents more detailed processing steps of the transmitter control module when a NACK signal is received with reliabilities of system bits and parity bits of one spatial data stream of a data packet for the MCW MIMO system.

FIG. 7 presents more detailed processing steps (700) of the transmitter control module (104, FIG. 4) when a NACK signal is received (702) with reliabilities of system bits (704) and parity bits (708) of one spatial data stream (coded data packet) for the MCW MIMO system. In the MCW MIMO system, the steps (700) of FIG. 7 are used for one spatial data stream, rather than all spatial data streams as shown in FIG. 6. At step (704), the transmitter control module (104, FIG. 4) receives reliability of system bits for a single data stream accompanied by a NACK signal (702). In the following step (708), the transmitter control module (104) also receives the reliability of parity bits of the said data stream. This is different from the reliability information of parity bits of the data packet consisting of multiple data streams as in the step 608 of FIG. 6 for SCM MIMO systems.

In the following step (710), the reliability of system bits is compared against the predetermined threshold of system bits for selecting an appropriate retransmission protocol. The result of comparison (714) leads to the options of either retransmitting IR data packets (712) or retransmitting Chase data packets (718). Further, the reliability of parity bits of the concerned data stream is compared with the predetermined threshold of parity bits (720), if the reliability of system bits of this data stream is greater or equal to the threshold of system bits at comparison (714). The result (722) of the comparison (720) leads to the options of either lowering the coding rate for retransmission (724) or keeping the coding rate. Furthermore, at step (730), the said data stream (either the Chase data packet or the IR combining data packet) is spatially processed (730) in combination with spatial data streams from other code words (706). The spatial processing is performed by switching the antenna over which the said data stream is transmitted with the antenna over which another data stream receiving a ACK signal is transmitted. The spatial data streams will then be passed for interleaving (744).

Figure 8:
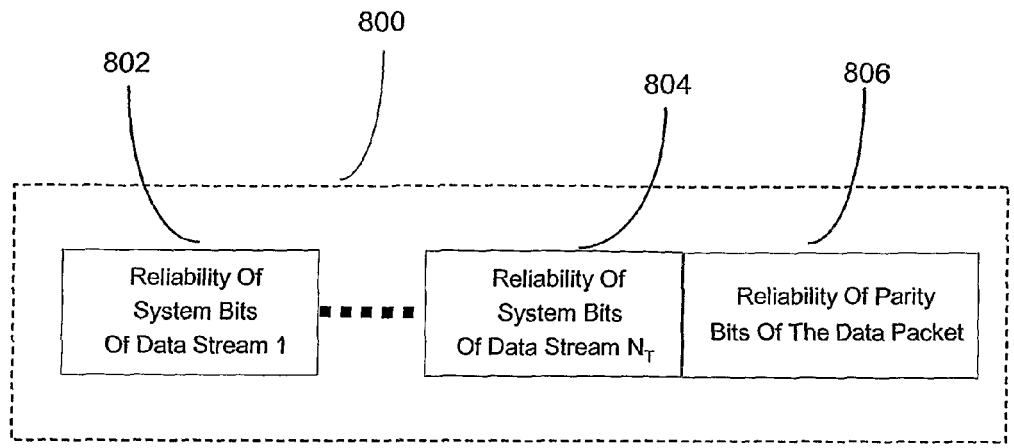
FIG. 8 presents contents of reliability information received by the transmitter control module when a NACK signal is received by the SCW MIMO system.

FIG. 8 presents contents of reliability information (800) received by the transmitter control module (104, FIG. 3) in the described example when a NACK signal is received by the SCW MIMO system. The information (800) comprises of reliability of system bits for all spatial data streams {i.e., data stream 1 (802) to $N_T$ (804)} and the reliability of parity bits of the data packet (806). All the reliability information (802, 804, 806) is transmitted together with the NACK signal over control channels. At the transmitter side, the transmitter monitors the control channels and decodes both the reliability information (802, 804, 806) and the NACK signal.

Figure 9:
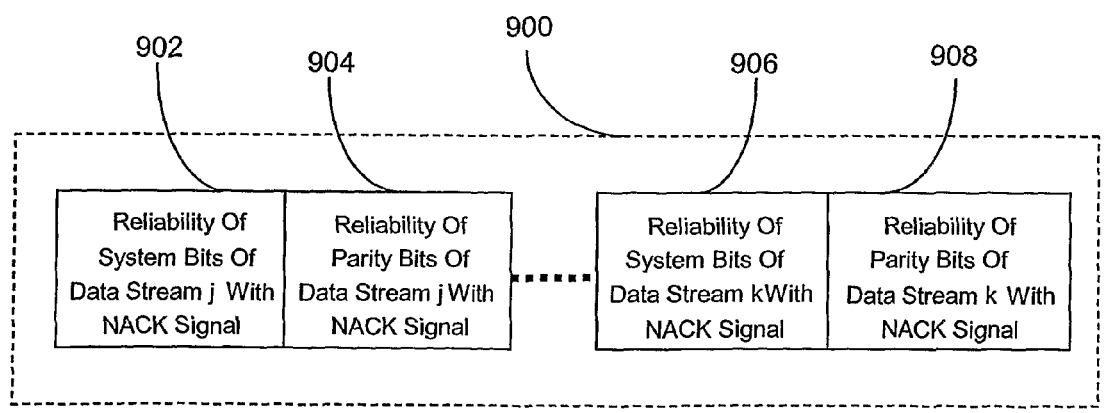
FIG. 9 presents contents of reliability information of a single data stream received by the transmitter control module when a NACK signal is received by the MCW MIMO system.

FIG. 9 presents contents of reliability information (900) fed back from the receiver to the transmitter accompanied by the NACK signal for the MCW MIMO system in the described example. The reliability information (900) comprises reliability of system bits and parity bits for all spatial data streams {i.e. data stream 1 (902, 904) to $N_T$ (906, 908)}.

Figure 10:
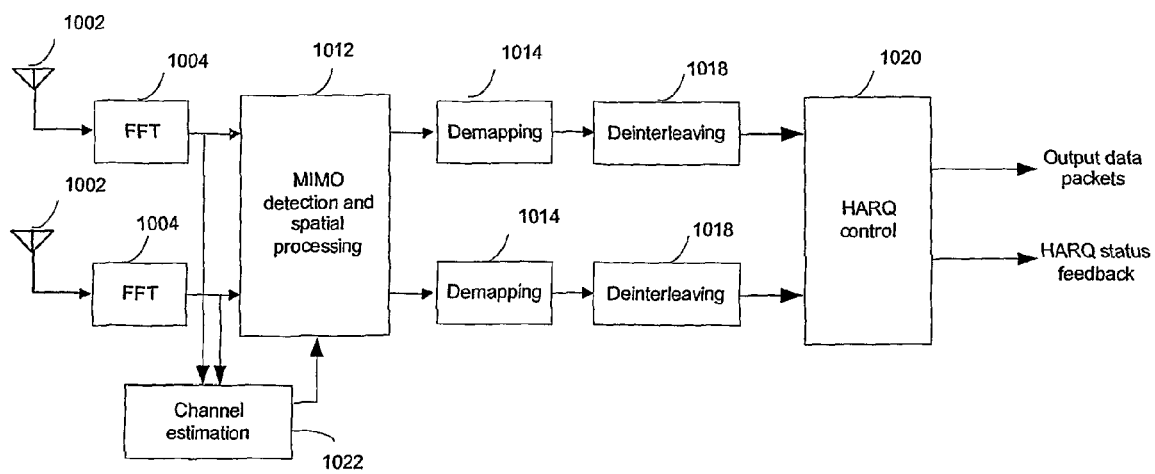
FIG. 10 presents functional modules of a receiver for a SCW MIMO system or a MCW MIMO system.

FIG. 10 shows the functional blocks of a receiver 1000 of the MIMO-OFDM system. The receiver 1000 has two receive antennas 1002. It is appreciated that the receiver 1002 can be extended to comprise multiple ($N_R$) receive antennas.

At the receiver 1000, the received signals are passed to the N-pint Fast Fourier transform (FFT) module 1004 for performing FFT. The data output from module 1004 is then passed to the MIMO detection and spatial processing module 1012 and the channel estimation module 1022. Channel fading gains experienced by the received data stream are estimated at the channel estimation module 1022 using the pilot signals that are incorporated in the received data. The estimated channel gains obtained in the channel estimation module 1022 are passed to module 1012 to assist the detection. The MIMO detection function of module 1012 is responsible for separating the received data stream into individual transmit data streams, since in the example embodiment, the data streams received at the receive antennas 1002 are comprised of $N_T$ independent signals transmitted from $N_T$ transmit antennas. The spatial processing function of module 1012 is to recover the antenna switching which might be performed at the transmitter control module 104.

After the detection and switching recovering of received data streams in module 1012, bit to symbol de-mapping of the data streams is performed at the De-mapping module 1014 to convert the symbol sequence to a sequence of data bits. Next, de-interleaving of the output data bits of the individual data streams of the de-mapping module 1014 is carried out by the de-interleaving module 1018. Thereafter, the output data stream of the de-interleaving module 1018 is passed to the HARQ control module 1020.

Depending on whether the system is a SCM MIMO system or a MCW MIMO system, the HARQ control module 1020 performs differently. For a SCW MIMO system, the HARQ control module 1020 first multiplexes the multiple spatial data streams into one data packet, which is then either decoded and CRC validated if the data packet is a newly transmitted packet or combined with precedingly received data packet, decoded and CRC validated if the data packet is a retransmitted packet. One decoded data packet as well as either a ACK signal if the data packet passes the CRC validation or a NACK signal if the data packet fails the CRC validation, are output from the HARQ control module 1020. For a MCW MIMO system, in contrast to a SCW MIMO system, multiplexing is not performed on the received multiple data streams. In stead, each of the received multiple data streams is either decoded and CRC validated if the said data stream is newly transmitted data stream, or combined with precedingly received data stream, decoded and CRC validated, independent of other data streams. A plurality of data packets as well as a plurality of ACK/NACK signals each for one data packet are output from the HARQ control module 1020.

Figure 11:
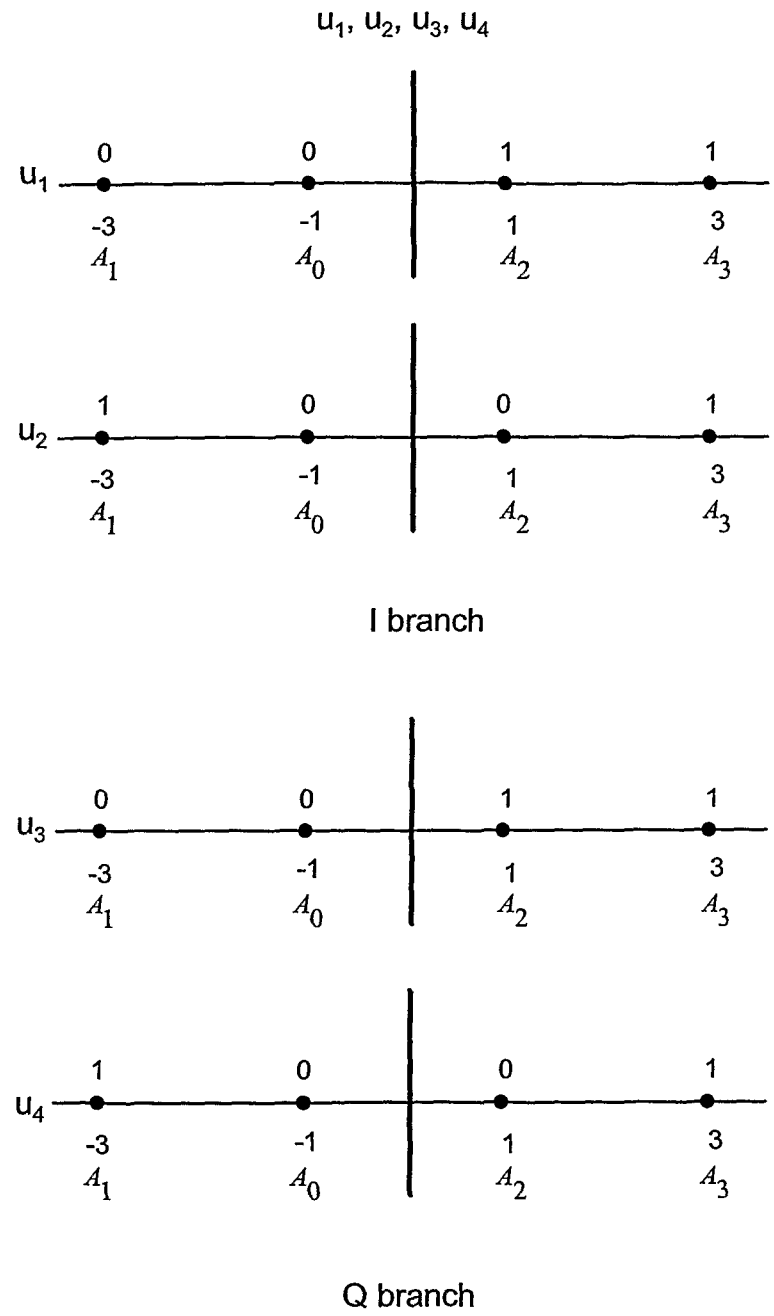
FIG. 11 presents I branch and Q branch mapping structures of 16-QAM (16-channel Quadrature Amplitude Modulation) scheme.

The comparing steps (610/614, 620/622/628 in FIG. 6, and 710/714, 720/722 in FIG. 7) for the reliability information of system bits and parity bits of a SCW MIMO and a MCW MIMO system will now be discussed in more detail for the respective described examples with reference to FIGS. 11 and 12.

Since the signals received by each receiving antenna comprises multiple transmit data streams from all transmitting antennas, the MIMO receiver (not shown) separates the received multiple data streams into independent transmit data streams by employing known MIMO detection techniques, such as the Linear Minimum Mean Square Error (LMMSE) detection technique. After the MIMO detection, the receiver de-maps data streams and converts symbol streams to soft-bit streams which are then passed to a channel decoder for decoding. The output of the de-mapping function is the LLR which is defined as LLR=log(P(u=1)/P(u=−1)). Here, P(x) denotes the probability that event x happens and u denotes a binary bit.

The computation of LLR value is described by using 16-QAM as an example. Referring to FIG. 11, one 16-QAM symbol contains 4 bits and is represented by $u_1, u_2, u_3,$ and $u_4$ while the LLR of each bit is computed according to equations 1 to 4:

$$LLR(u_1) = \log \frac{\exp(-I-A_2)^2/2\sigma^2) + \exp(I-A_3)^2/2\sigma^2)}{\exp(-I-A_0)^2/2\sigma^2) + \exp(I-A_1)^2/2\sigma^2)} \quad (1)$$

$$LLR(u_2) = \log \frac{\exp(-I-A_2)^2/2\sigma^2) + \exp(I-A_3)^2/2\sigma^2)}{\exp(-I-A_0)^2/2\sigma^2) + \exp(I-A_1)^2/2\sigma^2)} \quad (2)$$

$$LLR(u_3) = \log \frac{\exp(-I-A_2)^2/2\sigma^2) + \exp(I-A_3)^2/2\sigma^2)}{\exp(-I-A_0)^2/2\sigma^2) + \exp(I-A_1)^2/2\sigma^2)} \quad (3)$$

$$LLR(u_4) = \log \frac{\exp(-I-A_2)^2/2\sigma^2) + \exp(I-A_3)^2/2\sigma^2)}{\exp(-I-A_0)^2/2\sigma^2) + \exp(I-A_1)^2/2\sigma^2)} \quad (4)$$

In equations 1 to 4, $\sigma^2$ is the noise power. I and Q denote the I branch and the Q branch components of the received 16-QAM symbols respectively. $A_0=-d$, $A_1=-3d$, $A_2=d$, $A_3=3d$, $d=\sqrt{E_S/10}$ and $E_S$ is 16-QAM symbol energy.

The reliability of one demodulated bit can be measured by the magnitude of LLR or $R_e=|LLR|$. Based on equations 1 to 4, it can be seen that a larger LLR magnitude indicates a higher probability that a data bit is demodulated correctly.

Multiple system bits and parity bits may be present in a single received data stream and a metric (based on equation (1) to (4)) for representing the reliability of system bits and parity bits reflect the reliability of all the system bits and parity bits transmitted in the single spatial stream. Further, when retransmission takes place, retransmitted data streams and the originally transmitted data streams are combined for decoding. Hence the metric should reflect the combined effects. In the present embodiment, two methods can be used to measure the reliabilities of system bits and parity bits.

According to a first method, the reliability of system bits or parity bits is given by equation (5) as $$R_{e1} = \sum_n \sum_k \frac{|LLR(u_k^{(n)})|}{MN_S} \quad (5)$$

Here, $u_k^{(n)}$ denotes the kth system or parity bit in the nth transmission. M and Ns are the number of transmissions (including initial transmission and retransmissions) and the number of system or parity bits contained in one data stream respectively.

According to a second method, the least reliable system or parity bit is used to characterise the reliability of system or parity bits of a data stream.

$$R_{e2} = \sum_n \frac{|LLR(u_{least}^n)|}{M} \quad (6)$$

For MCW MIMO systems, since each spatial data stream is equivalent to one code word (coded data packet), the reliability of system bits and parity bits is calculated by either equation 5 or 6. For SCW MIMO systems, the reliability of system bits of one spatial data stream is computed by either equation 5 or 6. However, in the SCW MIMO systems, the reliability of parity bits of a data packet is computed by equation 7 as:

$$R_e^{(p)} = \sum_{s=1}^{N_T} \frac{R_e^{(p)}(s)}{N_T} \quad (7)$$

Here, $R_e^{(p)}(s)$ denotes the reliability of parity bits of spatial stream s.

Figure 12:
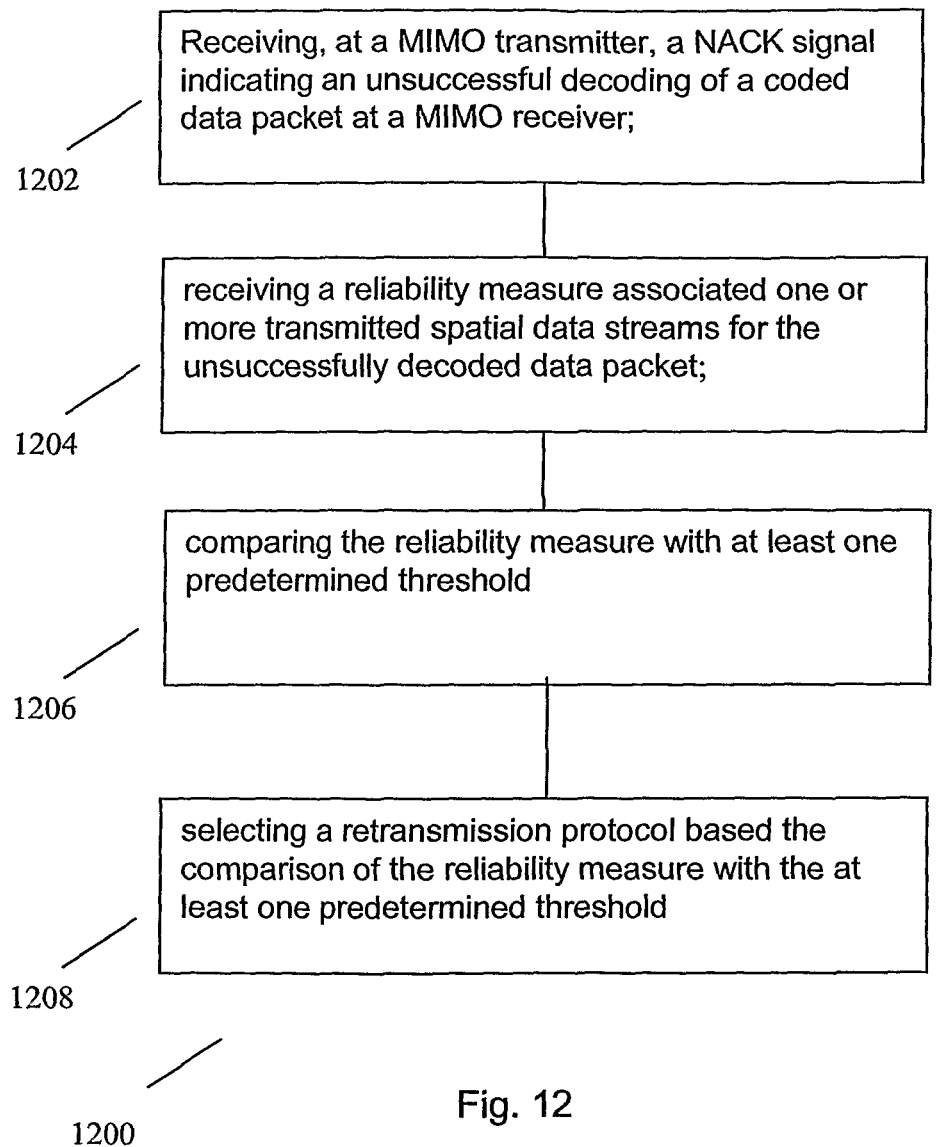
FIG. 12 shows a flow chart illustrating a retransmission control method in an example embodiment.

FIG. 12 shows a flow chart 1200 illustrating a retransmission control method in an example embodiment. At step 1202, a NACK signal indicating an unsuccessful decoding of a coded data packet at a MIMO receiver is received at a MIMO transmitter. At step 1204, a reliability measure associated with one or more spatial data streams for the unsuccessfully decoded data packet is received. At step 1206, the reliability measure is compared with at least one predetermined threshold (threshold of system bits or threshold of parity bits). At step 1108, a retransmission protocol is selected based the comparison of the reliability measure with the at least one predetermined threshold.

The above-mentioned embodiments seek to improve reception performance through the control of retransmission protocols (i.e., IR or Chase combining protocol), coding rate, and spatial processing based on the demodulation quality of system bits and parity bits. Since there is no single retransmission protocol more superior in all circumstances than the other, it is desirable to implement an adaptive retransmission control method that suits varying situations.

In MIMO systems, decoding errors on received data packets may occur because of severe corruption of system information and parity information in the initial transmission. When retransmission is requested in the described examples, depending on the causes of the decoding errors, decoding performances will vary depending on the retransmission protocols used. If the decoding errors are mainly due to the corruption of the system information, the retransmission of more parity information is desired. This is because the retransmitted parity information is code-combined with the originally transmitted data packets to assist the decoding of the system information properly. However, if the system information received in the initial transmission is not reliable, the coding gain provided with more parity information offers little help. Hence, Chase data packets should be sent to improve transmission quality of the system information. On the other hand, if the parity information is severely distorted in the initial unsuccessful transmission, which results in unreliable or insufficient parity information being provided for causing the decoding errors, it is more beneficial to resend more parity information to offer coding gain rather than resend Chase data packets to provide energy gain.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A retransmission control method comprising:
receiving, at a MIMO transmitter, a NACK signal indicating an unsuccessful decoding of a coded data packet at a MIMO receiver;
receiving a reliability measure associated with one or more transmitted spatial data streams for the unsuccessfully decoded data packet;
comparing the reliability measure with at least one predetermined threshold; and selecting a retransmission protocol based on the comparison of the reliability measure with the at least one predetermined threshold, the retransmission protocol comprising a Chase combining protocol or an Incremental Redundancy protocol, wherein the reliability measure comprises a system bits component and a parity bits component, the system bits component including one or more system bits reliability data indicative of the reliability of the system bits of said one or more transmitted spatial data streams, respectively, system bits reliability data associated with each data stream for the unsuccessfully decoded data packet in a Single Code Word (SCW) MIMO transmission, and the parity bits component comprises parity bits reliability data of the unsuccessfully decoded data packet, wherein the reliability measure is determined based on the one or more transmitted spatial data streams received at the MIMO receiver, and wherein the selecting of the retransmission protocol comprises:

selecting the Incremental Redundancy protocol for a retransmission data packet if the system bits reliability data is higher than a system bit threshold;

selecting the Chase combining protocol for the retransmission packet if the system bits reliability data is lower than or equal to the system bit threshold;

selecting a lowered coding rate, as compared to an original transmission, for the retransmission data packet using the Chase combining protocol if the parity bits reliability data is lower than or equal to a parity bits threshold; or selecting a same coding rate, as compared to the original transmission, for the retransmission data packet using the Chase combining protocol if the parity bits reliability data is higher than the parity bits threshold.

2. The retransmission control method according to claim 1, further comprising the step of retransmitting the data packet according to the selected retransmission protocol.

3. The retransmission control method according to claim 1, wherein the method further comprises:

segmenting the retransmission data packet into a plurality of spatial data streams over the same antennas as compared to the original transmission using the Chase combining protocol if the system bits reliability measure data is higher than the system bits threshold; or segmenting the data packet into a plurality of data streams over different antennas as compared to the original transmission using the Chase combining protocol if the system bits reliability data is higher than the system bits threshold.

4. The retransmission control method according to claim 3, wherein the segmenting of the retransmission data packet is performed after a selecting of a lower or a same coding rate, as compared to the original transmission, for the retransmission data packet using the Chase combining protocol.

5. The retransmission control method according to claim 1, wherein the system bits component comprises system bits reliability data associated with all data streams in a Multiple Code Words (MCW) MIMO transmission of respective unsuccessfully decoded data packets, and the parity bits component comprises parity bits reliability data associated with said all data streams in the MCW MIMO system.

6. The retransmission method according to claim 1, wherein the reliability measure is based on magnitudes of logarithmic likelihood ratios (LLRs) of respective demodulated system bits and parity bits of the initial unsuccessfully decoded data packet or the combination of the initial unsuccessfully decoded data packet and one or more retransmitted coded data packets.

7. The retransmission method according to claim 6, wherein the reliability measure is based on average magnitude of LLRs.

8. The retransmission method according to claim 1, wherein the reliability measure is based on a least reliable system bit and a least reliably parity bit having lowest respective magnitudes of LLR.

9. A transmitter for a MIMO communication system, the transmitter comprising:

means for receiving a NACK signal indicating an unsuccessful decoding of a coded data packet at a MIMO receiver;

means for receiving a reliability measure associated with one or more transmitted spatial data streams for the unsuccessfully decoded data packet;

means for comparing the reliability measure with at least one predetermined threshold; and means for selecting a retransmission protocol based on the comparison of the reliability measure with the at least one predetermined threshold, the retransmission protocol comprising a Chase combining protocol or an Incremental Redundancy protocol, wherein the reliability measure comprises a system bits component and a parity bits component, the system bits component includes one or more system bits reliability data indicative of the reliability of the system bits of said one or more transmitted spatial data streams, respectively, system bits reliability data associated with each data stream for the unsuccessfully decoded data packet in a Single Code Word (SCW) MIMO transmission, and the parity bits component comprises parity bits reliability data of the unsuccessfully decoded data packet, the reliability measure is determined based on the one or more transmitted spatial data streams received at the MIMO receiver, and said means for selecting of the retransmission protocol is configured to:

select the Incremental Redundancy protocol for a retransmission data packet if the system bits reliability data is higher than a system bit threshold;

select the Chase combining protocol for the retransmission packet if the system bits reliability data is lower than or equal to the system bit threshold, select a lowered coding rate, as compared to an original transmission, for the retransmission data packet using the Chase combining protocol if the parity bits reliability data is lower than or equal to a parity bits threshold; or select a same coding rate, as compared to the original transmission, for the retransmission data packet using the Chase combining protocol if the parity bits reliability data is higher than the parity bits threshold.

* * * * *